United States Patent [19]

Chang et al.

[11] Patent Number: 4,607,130
[45] Date of Patent: Aug. 19, 1986

[54] ACID-CATALYZED ORGANIC COMPOUND CONVERSION

[75] Inventors: Clarence D. Chang, Princeton; Joseph N. Miale, Lawrenceville, both of N.J.

[73] Assignee: Mobil Oil Corporation, New York, N.Y.

[21] Appl. No.: 787,181

[22] Filed: Oct. 15, 1985

Related U.S. Application Data

[60] Continuation-in-part of Ser. No. 726,194, Apr. 22, 1985, abandoned, which is a continuation-in-part of Ser. No. 555,118, Nov. 25, 1983, Pat. No. 4,550,092, which is a division of Ser. No. 317,037, Nov. 21, 1981, Pat. No. 4,435,516.

[51] Int. Cl.$^4$ .................................................. C07C 2/00
[52] U.S. Cl. ...................................... 585/415; 585/516; 585/533; 585/510; 585/700
[58] Field of Search ............... 585/415, 516, 533, 510, 585/700

[56] References Cited

U.S. PATENT DOCUMENTS

| | | | |
|---|---|---|---|
| Re. 31,919 | 6/1985 | Butter et al. | 502/66 |
| 4,180,689 | 12/1979 | Daires et al. | 585/415 |
| 4,334,114 | 6/1982 | Ellis | 585/415 |
| 4,350,835 | 9/1982 | Chester et al. | 585/415 |
| 4,354,049 | 12/1982 | Ball et al. | 585/415 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,435,516 | 3/1984 | Chang et al. | 502/71 |
| 4,440,630 | 4/1984 | Oleck et al. | 208/111 |
| 4,443,554 | 4/1984 | Dessau | 502/71 |
| 4,444,900 | 4/1984 | Chang et al. | 502/71 |
| 4,444,902 | 4/1984 | Chang et al. | 502/86 |
| 4,458,024 | 7/1984 | Oleck et al. | 502/66 |
| 4,461,845 | 7/1984 | Dessau et al. | 502/27 |
| 4,468,475 | 8/1984 | Kuehl | 502/71 |
| 4,477,582 | 10/1984 | Miale | 502/26 |
| 4,478,950 | 10/1984 | Chu | 502/85 |
| 4,500,418 | 2/1985 | Miale et al. | 208/114 |
| 4,500,419 | 2/1985 | Miale et al. | 585/415 |
| 4,500,420 | 2/1985 | Miale et al. | 585/415 |
| 4,500,421 | 2/1985 | Chang et al. | 585/415 |
| 4,500,422 | 2/1985 | Miale et al. | 485/415 |
| 4,512,876 | 4/1985 | Miale et al. | 208/114 |
| 4,513,091 | 4/1985 | Chang et al. | 502/71 |
| 4,515,682 | 5/1985 | Chang et al. | 208/111 |
| 4,517,075 | 5/1985 | Dessau et al. | 585/640 |
| 4,524,140 | 6/1985 | Chang et al. | 585/140 |
| 4,526,880 | 7/1985 | Chu et al. | 502/71 |
| 4,530,756 | 7/1985 | Chang et al. | 585/415 |
| 4,538,014 | 8/1985 | Miale et al. | 585/640 |
| 4,538,015 | 8/1985 | Miale et al. | 585/640 |
| 4,538,016 | 8/1985 | Miale et al. | 585/640 |
| 4,540,840 | 9/1985 | Miale et al. | 585/640 |
| 4,540,841 | 9/1985 | Miale et al. | 585/640 |
| 4,544,783 | 10/1985 | Chang et al. | 585/640 |
| 4,550,092 | 10/1985 | Chang et al. | 585/640 |
| 4,559,131 | 12/1985 | Miale | 585/407 |
| 4,559,315 | 12/1985 | Chang et al. | 502/71 |
| 4,563,435 | 1/1986 | Chu et al. | 502/71 |

*Primary Examiner*—Andrew H. Metz
*Assistant Examiner*—A. Pal
*Attorney, Agent, or Firm*—Alexander J. McKillop; Michael G. Gilman; Dennis P. Santini

[57] ABSTRACT

This invention relates to acid catalysis of organic compound feedstock, e.g. conversion of olefins and/or paraffins to higher hydrocarbons, over catalyst material treated in a special way for increasing the acid catalytic activity thereof. In particular, a novel catalyst activation process is followed to enhance the alpha value of high-silica zeolite catalyst by contact with an ammoniacal solution of an alkali metal aluminate under appropriate conditions of time, temperature and pH.

18 Claims, No Drawings

ACID-CATALYZED ORGANIC COMPOUND CONVERSION

CROSS-REFERENCE TO RELATED APPLICATIONS

This is a continuation-in-part of application Ser. No. 726,194, filed Apr. 22, 1985, now abandoned which is a continuation-in-part of application Ser. No. 555,118, filed Nov. 25, 1983, now U.S. Pat. No. 4,550,092, which is a division of application Ser. No. 317,037, filed Nov. 21, 1981, now U.S. Pat. No. 4,435,516, the entire content of each being herein incorporated by reference.

FIELD OF THE INVENTION

This invention relates to acid catalysis of organic compound feedstock, e.g. conversion of olefins and/or paraffins to higher hydrocarbons, over catalyst material treated in a special way for increasing the acid catalytic activity thereof. In particular, a novel catalyst activation process is followed to enhance the alpha value of high-silica zeolite catalyst by contact with an ammoniacal solution of an alkali metal aluminate under appropriate conditions of time, temperature and pH.

BACKGROUND OF THE INVENTION

Zeolite catalysts have become widely used in the processing of petroleum and in the production of various petrochemicals. Reactions such as cracking, hydrocracking, catalytic dewaxing, alkylation, dealkylation, transalkylation, isomerization, polymerization, addition, disproportionation and other acid catalyzed reactions may be performed with the aid of these catalysts. Certain natural and synthetic zeolites are known to be active for reactions of these kinds.

The common crystalline zeolite catalysts are the aluminosilicates such as Zeolites A, X, Y and mordenite. Structurally each such material can be described as a robust three dimensional framework of $SiO_4$ and $AlO_4$ tetrahedra that is crosslinked by the sharing of oxygen atoms whereby the ratio of total aluminum and silicon atoms to oxygen is 1:2. These structures (as well as others of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

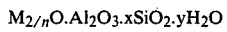

$M_{2/n}O.Al_2O_3.xSiO_2.yH_2O$ wherein M is a cation with valence n, x has a value of from 2 to 10, and y has a value which varies with the pore volume of the particular crystal under discussion. The above oxide formula may be rewritten as a general "structural" formula

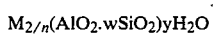

$M_{2/n}(AlO_2.wSiO_2)yH_2O$ wherein M and y are defined as above, and wherein w has a value from 1 to 5. In this representation, the composition of the robust framework is contained within the parenthesis, and the material (cations and water) contained in the channels is outside the parenthesis. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, such as with Zeolite A wherein x=2, there are fewer alumina tetrahedra than silica tetrahedra in the robust framework. Thus, aluminum represents the minor tetrahedrally coordinated constituent of the robust framework.

It is generally recognized that the composition of the robust framework may be varied within relatively narrow limits by changing the proportion of reactants, e.g., increasing the concentration of the silica relative to the alumina in the zeolite synthesis mixture. However, definite limits in the maximum obtainable silica to alumina ratio are observed. For example, synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit in a preparative process using conventional reagents. Corresponding upper limits in the silica to alumina ratio of mordenite and erionite via the synthetic pathway are also observed. It is sometimes desirable to obtain a particular zeolite, for any of several reasons, with a higher silica to alumina ratio than is available by direct synthesis. U.S. Pat. No. 4,273,753 to Chang and the references contained therein describe several methods for removing some of the aluminum from the framework, thereby increasing the silica to alumina ratio of a crystal.

For the above zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it aquires a large catalytic activity measured by the alpha activity test, which test is more fully described below. And, the ammonium form of the zeolite desorbs ammonia at elevated temperature in a characteristic fashion.

Synthetic zeolites wherein x is greater than 12, which have little or substantially no aluminum content, are known. Such zeolites have many important properties and characteristics and a high degree of structural stability such that they have become candidates for use in various processes including catalytic processes. Materials of this type are known in the art and include high silica content aluminosilicates, such as ZSM-5 (U.S. Pat. No. 3,702,886), ZSM-11 (U.S. Pat. No. 3,709,979), and ZSM-12 (U.S. Pat. No. 3,832,449) to mention a few. Unlike the zeolites described above wherein x=2 to 5, the silica to alumina ratio for at least some of the high silica content zeolites is unbounded. ZSM-5 is one such example wherein the silica to alumina ratio is at least 12. U.S. Pat. No. 3,941,871 discloses a crystalline metal organosilicate essentially free of aluminum and exhibiting an X-ray of diffraction pattern characteristic of ZSM-5. U.S. Pat. Nos. 4,061,724, 4,073,865 and 4,104,294 describe microporous crystalline silicas or organosilicates wherein the alumina content present is at very low levels. Some of the high silica content zeolites contain boron or iron.

Because of the extremely low alumina content of certain high silica content zeolites, their catalytic activity is not as great as materials with a higher alumina content. Therefore, when these materials are contacted with an acidic solution and thereafter are processed in a conventional manner, they are not as catalytically active for acid-catalyzed reaction as their higher alumina content counterparts.

In U.S. Pat. Nos. 3,960,978 and 4,021,502, Plank, Rosinski and Givens disclose conversion of $C_2$-$C_5$ olefins, alone or in admixture with paraffinic components, into higher hydrocarbons over crystalline zeolites having controlled acidity. Garwood et al. have also contributed processing techniques for conversion of olefins to gasoline and distillate, as in U.S. Pat. Nos. 4,150,062, 4,211,640 and 4,227,992. The above identified disclosures are incorporated herein by reference.

Olefinic feedstocks may be obtained from various sources, including fossil fuel processing streams, such as gas separation units, cracking of $C_2+$ hydrocarbons, coal byproducts, and various synthetic fuel processing streams. Cracking of ethane and conversion of conversion effluent is disclosed in U.S. Pat. No. 4,100,218 and conversion of ethane to aromatic over Ga-ZSM-5 is disclosed in U.S. Pat. No. 4,350,835. Olefinic effluent from fluidized catalytic cracking of gas oil or the like is a valuable source of olefins, mainly $C_3$-$C_4$ olefins.

A number of U.S. patents teach heteroatom feed conversion. Examples of these are U.S. Pat. Nos. 3,894,104, 3,894,106, 3,894,107, 3,899,544, 3,965,205, 4,046,825, 4,156,698 and 4,311,865. Methanol is converted to gasoline in U.S. Pat. Nos. 4,302,619, 3,928,483 and 4,058,576 as examples. Methanol is converted to olefins and/or aromatics in, for example, U.S. Pat. Nos. 3,911,041, 4,025,571, 4,025,572, 4,025,575 and 4,049,735.

U.S. Pat. No. 4,380,685 teaches para-selective alkylation, transalkylation or disproportionation of a substituted aromatic compound to form a dialkylbenzene compound mixture over catalyst comprising zeolite characterized by a constraint index 1 to 12 and a silica:alumina mole ratio of at least 12:1, the catalyst having thereon incorporated various metals and phosphorus. Other patents covering alkylation and transalkylation include U.S. Pat. Nos. 4,127,616, 4,361,713, 4,365,104, 4,367,359, 4,370,508 and 4,384,155. Toluene is converted to para-xylene in U.S. Pat. Nos. 3,965,207, 3,965,208, 3,965,209, 4,001,346, 4,002,698, 4,067,920, 4,100,215 and 4,152,364, to name a few. Alkylation with olefins is taught, for example, in U.S. Pat. Nos. 3,962,364 and 4,016,218 and toluene is disproportionated in, for example, U.S. Pat. Nos. 4,052,476, 4,007,231, 4,011,276, 4,016,219 and 4,029,716. Isomerization of xylenes is taught in, for example, U.S. Pat. Nos. 4,100,214, 4,101,595, 4,158,676, 4,159,282, 4,351,979, 4,101,597, 4,159,283, 4,152,363, 4,163,028, 4,188,282 and 4,224,141.

SUMMARY OF THE INVENTION

A unique crystalline zeolite material having enhanced acid activity (measured by alpha value) has been discovered by the technique of contacting a high silica-containing zeolite, either as crystallized or after calcination, with an ammoniacal alkali metal aluminate solution, preferably an ammoniacal sodium aluminate solution, at a pH of at least 10. Such contacting by vacuum impregnation technique is particularly preferred. The use of this material as catalyst for acid-catalyzed chemical reactions is the object of the present invention.

The novel process of this invention permits the use of very high silica content zeolites which have all the desirable properties inherently possessed by such high silica materials, and yet have an acid activity (alpha value) which heretofore has only been possible to achieve with materials having a higher aluminum content in the robust framework.

EMBODIMENTS

As has heretofore been stated, the zeolite catalyst for use in the process of this invention has been treated in a special way to enhance its activity for acid-catalyzed reactions. The expression "high silica content" is intended herein to define a crystalline zeolite structure which has an initial silica-to-alumina mole ratio of at least 500, and more particularly greater than 500, up to and including those highly siliceous materials where the silica-to-alumina ratio is from greater than 1000 to as reasonably close to infinity as practically possible. This latter group of highly siliceous materials is exemplified by U.S. Pat. Nos. 3,941,871, 4,061,724, 4,073,865 and 4,104,294 wherein the materials are prepared from forming solutions to which no deliberate addition of aluminum was made. However, trace quantities of aluminum are present due to the impurity of the reactant solutions.

The preferred high silica content zeolite that is to be activated by the process of this invention has the crystal structure of an intermediate pore size zeolite, such as ZSM-5, evidenced by X-ray diffraction and "Constraint Index". This type of zeolite freely sorbs normal hexane, and has a pore size intermediate between the small pore zeolites such as Linde A and the large pore zeolites such as Linde X, the pore windows in the crystals being formed of 8-membered rings. The crystal framework densities of this type zeolite in the dry hydrogen form is not less than 1.6 grams per cubic centimeter. It is known that such zeolites exhibit constrained access to singly methyl-branched paraffins, and that this constrained access can be measured by cracking a mixture of n-hexane and 3-methylpentane and deriving therefrom a Constraint Index, as described in U.S. Pat. No. 4,231,899, incorporated herein by reference as to that description. Such zeolites exhibit a Constraint Index of 1 to 12 provided they have sufficient catalytic activity or are activated by the method of this invention to impart such activity. Intermediate pore zeolites useful for the process of this invention are those having a crystal structure exemplified by ZSM-5, ZSM-11, ZSM-12, ZSM-23, ZSM-35, ZSM-38 and ZSM-48. Column 4, line 30 to column 11, line 26 inclusive of U.S. Pat. No. 4,385,195 issued May 24, 1983, and the U.S. Patents referred to therein, are incorporated herein by reference for a detailed description including the X-ray diffraction patterns of the foregoing zeolites; a detailed description of crystal density and method for measuring this property; a detailed description of Constraint Index and method for measuring this property; and, for matter related to the foregoing.

The high silica content zeolite is treated with an ammoniacal alkali metal aluminate solution, preferably an ammoniacal sodium aluminate solution, at a pH of at least 10. A particularly preferred technique involves contacting said high silica zeolite with said ammoniacal alkali metal aluminate solution by vacuum impregnation.

The amount of solution utilized to treat the high silica-containing zeolite is not narrowly critical and the solution to zeolite ratio can vary from about 0.3 to less than about 10 grams of solution per gram of zeolite. The amount of solution will vary as a function of its concentration and the desired enhancement of activity.

The treatment is carried out by contacting said high silica zeolite, as crystallized or after calcination, with the above described solution at temperatures ranging from about 20° C. to about 50° C., and preferably from about 20° C. to about 35° C., for periods of time ranging from about 20 minutes to about 30 days; preferably from about ½ hour to about 5 days.

Following this treatment, the high silica-containing zeolite is processed into its catalytically active form by conventional techniques, such as base exchange with appropriate cations such as hydrogen, ammonium, rare earth, and mixtures thereof. The high silica-containing materials are then calcined by heating to a temperature in the range of 200°-600° C. in an atmosphere such as air, nitrogen, etc. and atmospheric, subatmospheric, or superatmospheric pressures for between about 1 and 48 hours. It is to be understood that the high silica-containing zeolites can, if desired, be incorporated in a matrix by techniques well known in the art. Conventional matrices include inorganic oxides, such as silica, alumina, silica-alumina, etc.

In U.S. Pat. No. 4,478,950, there is disclosed a method for enhancing the activity of high silica zeolites by contacting them with a solution containing both a source of aluminum ions and a quaternary ammonium compound at a pH of at least 7, and most preferably 9-12. The present invention represents an improvement in that expensive quaternary ammonium compounds are not needed and the procedure involves the use of common and relatively cheaper materials.

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the standard reference have about the same activity. The alpha test is described in U.S. Pat. No. 3,354,078 and in *The Journal of Catalysis*, Vol. IV, pp. 527-529 (August 1965), each incorporated herein as to that description. The relationship of alpha value to the intrinsic rate constants of other acid-catalyzed reactions is detailed in *Nature*, Vol. 309, pp. 589-591, June 14, 1984, incorporated herein by reference as to that detail.

The feedstock to the present process comprises $C_2-C_7$ paraffins and/or olefins of at least two carbon atoms. The product comprises $C_5^+$ hydrocarbons. When the feedstock comprises paraffins, product comprises $C_5^+$ hydrocarbons such as aromatics, e.g., benzene, toluene and xylenes, and conversion conditions include a temperature of from about 100° C. to about 700° C., a pressure of from about 10 kPa to about 11000 kPa, preferably from 10 kPa to 7000 kPa, a liquid hourly space velocity (LHSV) of from about 0.1 $hr^{-1}$ to about 500 $hr^{-1}$, preferably from 0.5 $hr^{-1}$ to 400 $hr^{-1}$, and a hydrogen/hydrocarbon mole ratio of from 0 (no added hydrogen) to about 20. Under these same conversion conditions, a feedstock comprising $C_2-C_7$ olefins is converted to $C_5^+$ hydrocarbon product comprising aromatics, e.g., benzene, toluene and xylenes.

A feedstock to the present process may comprise primarily $C_2-C_7$ olefins for conversion to gasoline and distillate products when the conversion conditions are tailored to be within the following ranges. In general, the temperature will be maintained at from about 190° C. to about 375° C., the pressure at from about 400 kPa to about 11000 kPa, preferably from 400 kPa to about 7000 kPa, and the liquid hourly space velocity (LHSV based on feedstock olefin) at from about 0.3 to about 2, preferably from 0.5 to 2 $hr^{-1}$. Specifically when the present process is operated in the distillate mode, the temperature will be from about 190° C. to about 315° C., the pressure from about 4200 kPa to about 11000 kPa, preferably from 4200 kPa to 7000 kPa, and the LHSV from about 0.3 to about 1.0 $hr^{-1}$, preferably from 0.5 to 1.0 $hr^{-1}$. When the present process is operated in the gasoline mode, the temperature will be from about 230° C. to about 375° C., the pressure from about 400 kPa to about 4700 kPa, preferably from 400 kPa to 3000 kPa and the LHSV from about 0.3 to about 2.0, preferably from 0.5 to 2.0 $hr^{-1}$. The feedstocks, products, process conditions and other variables for conversion of olefins to higher hydrocarbons are detailed in U.S. Pat. No. 4,456,779, incorporated entirely herein by reference.

The following examples are for the purpose of illustrating this invention, and are not intended to limit the scope thereof, which scope is defined by this entire specification including the claims appended thereto. All alpha values reported in these examples refer to measurements made with the sample in the hydrogen form.

EXAMPLE 1

A 2 gram sample of ZSM-5 zeolite having a silica-to-alumina ratio of about 26,000 and a sodium content of about 0.23 weight percent was impregnated with 3 grams of 5 weight percent sodium aluminate solution and calcined in air at 538° C. for 20 hours.

EXAMPLE 2

The product of Example 1 was treated with a 1 Normal, 8 weight percent solution of ammonium nitrate and calcined as in Example 1.

EXAMPLE 3

A sample of the same ZSM-5 used in Example 1 was vacuum impregnated with a solution of sodium aluminate which was diluted by an equal volume of concentrated (12N) $NH_4OH$. The pH was 12.4. After 30 minutes, the sample was dried and submitted to three cycles of 1N $NH_4NO_3$ treatment followed by hot water washing. The sample was dried and calcined at 538° C. as in Example 1.

ACID CATALYSIS

The products of Examples 1, 2 and 3 were evaluated for acid activity by the alpha test.

The results are shown in the following table:

TABLE 1

| Activity of High Silica ZSM-5 After Treatment | | |
|---|---|---|
| Example | | Alpha |
| 1 | $NaAlO_2$ treat | 0.4 |
| 2 | $NaAlO_2/NH_4NO_3$ treat | 0.2 |
| 3 | $NaAlO_2/NH_4OH$ imp + $NH_4NO_3$ treat | 12 |

From the above table, it can be seen that the process of this invention resulted in an indication of dramatically increased acid activity. The procedure of Examples 1 and 2 did not result in any significant improvement, whereas the catalyst preparation method of Example 3 resulted in an enhanced conversion process.

EXAMPLE 4

To demonstrate the present invention, a 2 gram sample of calcined product from Example 3 is placed in a reactor vessel and contacted with feedstock comprised of propylene at about 230° C., 10,339 kPa and 0.38 hr$^{-1}$ (LHSV). Conversion of propylene is measured to be about 83.5 wt. % with the product comprised of 46% 30°–330° F. b.p. material, 51 wt. % 330°–650° F. b.p. material and 3 wt. % 650° F.+ b.p. material.

EXAMPLE 5

A feedstock of one-half propane and one-half butane is passed through the reactor vessel containing 2 grams of freshly calcined product from Example 3 at a temperature of 400° C., a pressure of 1000 kPa and a liquid hourly space velocity of 50 hr$^{-1}$. Product comprising benzene, toluene and xylenes is observed with conversion of feedstock paraffins measured at about 50%.

What is claimed is:

1. A process for conducting acid-catalyzed conversion of feedstock comprising $C_2+$ olefins, $C_2$–$C_7$ paraffins or a mixture thereof to product comprising $C_5+$ hydrocarbon compounds which comprises contacting said feedstock at conditions sufficient to convert said feedstock to said $C_5+$ product hydrocarbons with a catalyst comprising a zeolite composition prepared by a method comprising treating a crystalline zeolite having an initial silica-to-alumina mole ratio of at least 500 with an ammoniacal solution of an alkali metal aluminate for a period of time ranging from about 20 minutes to about 30 days at a temperature of from about 20° C. to about 50° C. and at a pH of at least 10.

2. The process of claim 1 wherein said alkali metal aluminate is sodium aluminate.

3. The process of claim 1 wherein said crystalline zeolite has a silica-to-alumina mole ratio greater than 1000.

4. The process of claim 2 wherein said crystalline zeolite has a silica-to-alumina mole ratio greater than 1000.

5. The process of claim 1 wherein said treating with an ammoniacal solution of an alkali metal aluminate is by vacuum impregnation.

6. The process of claim 1 wherein said crystalline zeolite has the structure of ZSM-5, ZSM-11, ZSM-12, ZSM-23, ZSM-35, ZSM-38 or ZSM-48.

7. The process of claim 6 wherein said crystalline zeolite has the structure of ZSM-5.

8. The process of claim 1 wherein said conversion conditions include a temperature of from about 100° C. to about 700° C., a pressure of from about 10 kPa to about 11000 kPa, a liquid hourly space velocity of from about 0.1 hr$^{-1}$ to about 500 hr$^{-1}$ and a hydrogen/hydrocarbon mole ratio of from 0 to about 20.

9. A process for converting a feedstock comprising $C_2$–$C_7$ olefins to conversion product comprising $C_5+$ hydrocarbon compounds which comprises contacting said feedstock at conditions sufficient to convert said feedstock to said $C_5+$ hydrocarbons with a catalyst comprising a zeolite composition prepared by a method comprising treating a crystalline zeolite having an initial silica-to-alumina mole ratio of at least 500 with an ammoniacal solution of an alkali metal aluminate for a period of time ranging from about 20 minutes to about 30 days at a temperature of from about 20° C. to about 50° C. and at a pH of at least 10.

10. The process of claim 9 wherein said alkali metal aluminate is sodium aluminate.

11. The process of claim 9 wherein said crystalline zeolite has a silica-to-alumina mole ratio greater than 1000.

12. The process of claim 10 wherein said crystalline zeolite has a silica-to-alumina mole ratio greater than 1000.

13. The process of claim 9 wherein said treating with an ammoniacal solution of an alkali metal aluminate is by vacuum impregnation.

14. The process of claim 9 wherein said crystalline zeolite has the structure of ZSM-5, ZSM-11, ZSM-12, ZSM-23, ZSM-35, ZSM-38 or ZSM-48.

15. The process of claim 14 wherein said crystalline zeolite has the structure of ZSM-5.

16. The process of claim 9 wherein said conversion conditions include a temperature of from about 190° C. to about 375° C., a pressure of from about 400 kPa to about 11000 kPa and a liquid hourly space velocity of from about 0.3 hr$^{-1}$ to about 2 hr$^{-1}$.

17. The process of claim 9 wherein said conversion conditions include a temperature of from about 190° C. to about 315° C., a pressure of from about 4200 kPa to about 11000 kPa and a liquid hourly space velocity of from about 0.3 hr$^{-1}$ to about 1 hr$^{-1}$.

18. The process of claim 9 wherein said conversion conditions include a temperature of from about 230° C. to about 375° C., a pressure of from about 400 kPa to about 4700 kPa and a liquid hourly space velocity of from about 0.3 hr$^{-1}$ to about 2 hr$^{-1}$.

* * * * *